United States Patent
Tores

(10) Patent No.: US 7,367,605 B2
(45) Date of Patent: May 6, 2008

(54) FLEXIBLE SHAFT WHOSE CORE YARN ELASTICITY IS LESS THAN THAT OF WOUND YARN

(75) Inventor: Denis Tores, Vaux le Penil (FR)

(73) Assignee: Inderflex-Technoflex, Le Châtel En Brie (FR)

( * ) Notice: Subject to any disclaimer, the term of this patent is extended or adjusted under 35 U.S.C. 154(b) by 0 days.

(21) Appl. No.: 11/295,713

(22) Filed: Dec. 6, 2005

(65) Prior Publication Data

US 2006/0144633 A1 Jul. 6, 2006

Related U.S. Application Data

(63) Continuation of application No. PCT/FR2004/001396, filed on Jun. 4, 2004.

(30) Foreign Application Priority Data

Jun. 6, 2003 (FR) .................................. 03 06870
Jul. 25, 2003 (FR) .................................. 03 09157

(51) Int. Cl.
B60N 2/02 (2006.01)

(52) U.S. Cl. ............................... 296/65.15; 296/65.18; 464/58; 74/89.17

(58) Field of Classification Search ............ 296/65.12, 296/65.15, 65.18; 464/52, 58, 59; 604/528; 74/89.2, 89.17; 248/429; 297/344.1, 344.11
See application file for complete search history.

(56) References Cited

U.S. PATENT DOCUMENTS

| 1,568,546 | A | 1/1926 | Cook |
|---|---|---|---|
| 3,292,389 | A | 12/1966 | Adloff et al. |
| 3,389,579 | A | 6/1968 | Horst et al. |
| 3,443,307 | A | 5/1969 | Schlick et al. |
| 3,769,813 | A | 11/1973 | Okada |
| 4,112,708 | A | 9/1978 | Fukuda |
| 4,915,340 | A | 4/1990 | Terada et al. |
| 5,288,270 | A * | 2/1994 | Ishikawa ........................ 464/7 |
| 5,558,578 | A | 9/1996 | Uryu et al. |
| 5,816,923 | A | 10/1998 | Webler et al. |
| 5,893,426 | A | 4/1999 | Shimizu et al. |
| 5,931,736 | A | 8/1999 | Scherer et al. |
| 6,038,819 | A | 3/2000 | Klein |
| 6,318,785 | B1 | 11/2001 | Tousignant |
| 6,344,037 | B1 | 2/2002 | Mamayek et al. |
| 2005/0093328 | A1* | 5/2005 | Moriyama ............... 296/65.15 |

FOREIGN PATENT DOCUMENTS

| DE | 11 03 087 | 3/1961 |
|---|---|---|
| DE | 11 11 464 | 7/1961 |
| DE | 200 14 561 | 12/2000 |
| EP | 1 245 434 | 10/2002 |
| EP | 1 286 065 | 2/2003 |

(Continued)

*Primary Examiner*—Jason S Morrow
(74) *Attorney, Agent, or Firm*—Harness, Dickey & Pierce, P.L.C.

(57) ABSTRACT

A flexible shaft designed to rotate inside a sheath for transmitting rotary motion can include at least one core wire and winding wired wound around the core wire. The core wire has an elasticity and resilience that are lower than the elasticity and resilience of the winding wires. According to some examples, the core wire can be formed of annealed copper or annealed brass. The winding wires can be formed of steel.

17 Claims, 2 Drawing Sheets

FOREIGN PATENT DOCUMENTS

| | | |
|---|---|---|
| FR | 674 177 | 1/1930 |
| FR | 927 165 | 10/1947 |
| FR | 1266374 | 5/1961 |
| FR | 2 822 418 | 9/2002 |
| GB | 327566 | 4/1930 |
| GB | 1 203 191 | 8/1970 |
| GB | 2 176 562 | 12/1986 |
| JP | 7-310730 | 11/1995 |
| WO | WO92/08061 | 5/1992 |

* cited by examiner

FLEXIBLE SHAFT WHOSE CORE YARN ELASTICITY IS LESS THAN THAT OF WOUND YARN

CROSS REFERENCE TO RELATED APPLICATIONS

This application is a continuation of Ser. No. PCT/FR2004/001396, filed Jun. 4, 2004, which claims priority to French Application No. 03/06870, filed Jun. 6, 2003 and French Application No. 03/09157, filed Jul. 25, 2003, all of which are incorporated by reference herein.

BACKGROUND AND SUMMARY OF THE INVENTION

The invention relates to a flexible shaft for transmitting rotary motion, to a rotary motion transmission device including such a flexible shaft, and to an adjustment system for adjusting a motor vehicle seat, which system includes such a device.

Transmission devices are known that comprise a flexible shaft and a sheath inside which the shaft is received. In particular, the flexible shaft can be formed of one or more core wires made of steel and around which winding wires are wound, the winding wires also being made of steel. In such a transmission device, in particular for adjusting a motor vehicle seat, the speeds of rotation of the flexible shaft in the sheath are higher than 2000 revolutions per minute (r.p.m.), and conventionally about 3000 r.p.m. During rotation at such speeds, vibration of small amplitude appears that propagates along the flexible shaft and that give rise to noise. Trials conducted by the Applicant have shown that one of the causes of the appearance of such vibration is that the elasticity and resilience of the steel core wires used to make the flexible shaft are too high. An object of the invention is to mitigate that problem by proposing a flexible shaft whose core wires present elasticity and resilience that are lower while preserving good strength.

The Applicant has observed that the function of the core wire is not to transmit the rotary torque, but rather to serve as a support or strength member for the winding wires. Thus, it is possible to reduce the elasticity and resilience of the core wire while preserving the performance of the flexible shaft. Such performance is preserved by means of the good strength of the core wire. Said strength makes it possible to provide a good support for the steel winding wires that transmit the rotary torque. Thus, the combination of a core wire having low elasticity and of winding wires that are elastic makes it possible to obtain a reduction in the vibration phenomenon and also to preserve the performance of the flexible shaft.

To this end, and in a first aspect, the invention provides a flexible shaft designed to rotate inside a sheath for the purpose of transmitting rotary motion, said shaft comprising at least one core wire and winding wires wound around said core wire, the core wire presenting elasticity and resilience that are lower than the elasticity and resilience of the winding wires. In a second aspect, the invention provides a rotary motion transmission device comprising a sheath and a flexible shaft received inside the sheath, the sheath comprising a core formed of a hollow cylinder whose inside diameter is arranged to enable said shaft to rotate inside said sheath, the flexible shaft being a shaft as described above.

In a third aspect, the invention provides an adjustment system for adjusting a motor vehicle seat, said system comprising at least one adjustment runner mounted on the structure of the vehicle and adjustable means for fastening the seat to said runner(s), said system further comprising a drive motor provided with at least one rotary outlet, said adjustment system further comprising a transmission device as described above and that is disposed between the outlet of said drive motor and said fastening means, so as to move said fastening means along said adjustment runner in response to said outlet rotating.

BRIEF DESCRIPTION OF THE DRAWINGS

Other objects and advantages of the invention appear from the following description, given with reference to the accompanying drawing, in which.

DETAILED DESCRIPTION

Figure 1:
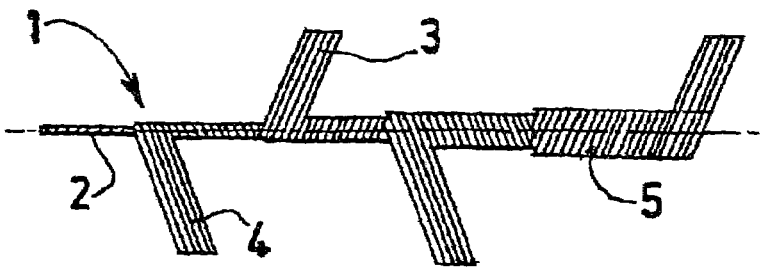
FIG. 1 is a diagrammatic section view of a flexible shaft of the invention, showing the core wire around which the winding wires are wound.

With reference to FIG. 1, the flexible shaft 1 comprises a core wire 2 around which winding wires 3 are wound. It is also possible to provide a plurality of twisted-together core wires. The core wire 2 is made of annealed copper wire or annealed brass wire presenting low elasticity and resilience characteristics while having good mechanical characteristics such as crush strength and fold strength even after heat treatment at 400° C. that can be applied to obtain the mechanical performance desired for transmitting rotary torque. It is also possible to use other materials presenting elasticity, resilience, and strength characteristics that are similar to those of the annealed brass or copper used for making the core wire 2. In a variant, it is possible to consider using the same material for the core wire 2 and for the winding wires 3. Such a material is subjected to different treatment depending on whether it is for use in a core wire or in a winding wire, so as to obtain the desired elasticity, resilience, and strength characteristics.

The winding wires 3 are steel wires, which makes it possible to impart the desired performance to the flexible shaft 1. For example, said winding wires are disposed such as to form a strip of wires 4 that is wound around the core wire 2. It is possible to consider winding one or more strips 4 around the core wire 2 as a function of the diameter and of the mechanical characteristics that it is desired to impart to the flexible shaft 1. In particular, a plurality of strips 4 can be superposed around the core wire 2.

Thus, the core wire 2 presents elasticity and resilience lower than the elasticity and resilience of the winding wires 3 while maintaining good strength. As indicated above, the combination of a core wire having low resilience and of winding wires that are elastic makes it possible to reduce the phenomenon of vibration while also preserving the performance of the shaft 1 in terms of transmitting rotary torque. For example, the winding wires 3 are wound helically around the core wire 2. Such a winding generates pieces in relief in the outside surface 5 of the flexible shaft 1. Such pieces in relief can be removed by machining the flexible shaft 1 so that its outside surface 5 is substantially smooth. Such machining makes it possible to reduce further the vibration of the flexible shaft 1 when it is turning at high speed inside a sheath.

Figure 2:
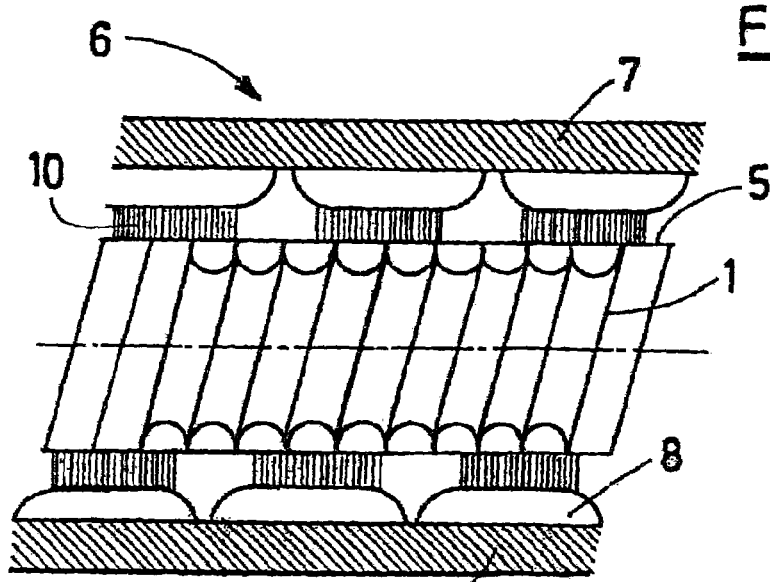
FIG. 2 is a fragmentary diagrammatic longitudinal section view of a rotary motion transmission device.

With reference to FIG. 2, a description follows of a transmission device 6 for transmitting rotary motion and including a flexible shaft 1 as described above. Such a device 6 for transmitting rotary motion comprises a flexible shaft 1 and a sheath 7. The shaft 1 is received in the sheath 7 whose inside diameter is such as to enable the shaft 1 to rotate inside the sheath 7. The speeds of rotation of the core are conventionally about 3000 r.p.m. In order to make such a rotation speed possible, clearance of a few tenths of a millimeter is provided between the flexible shaft 1 and the sheath 7.

In addition, it is possible to provide a lubricant inside the sheath 7 so as to make it easier for the shaft 1 to rotate inside said sheath. When the shaft 1 is machined so as to present a substantially smooth outside surface 5, it is possible to avoid the Archimedes screw phenomenon that gives rise to displacement of the lubricant while the shaft is rotating inside the sheath 7.

The sheath 7 comprises a core 8 and an outer tubular cladding 9 encasing the core 8. For example, the core 8 can be formed of a helical spring made of a metal material. For example, said spring is formed from a helically wound metal strip. The turns of the spring are non-touching, thereby imparting flexibility to the sheath 7. The outer cladding 9 can be made of an extruded plastics material, e.g. polyvinyl chloride (PVC).

The core 8 of the sheath 7 can be provided with flocking 10 on its inside surface, i.e. on the surface facing the flexible shaft 1. To this end, the inside surface of the core 8 is coated by any known method, e.g. electrostatically, with flocking 10 that can comprise 6.6 polyamide fibers. It has been observed that such an arrangement in which the sheath 7 is internally flocked presents good sound damping. The flocking 10 makes it possible to guarantee mechanical isolation between the shaft 1 and the sheath 7. In a variant (not shown), the same sound-damping effect can be obtained by using a core wire 2 of low elasticity and of low resilience in a flexible shaft 1 whose outside surface is coated with flocking.

Figure 3:
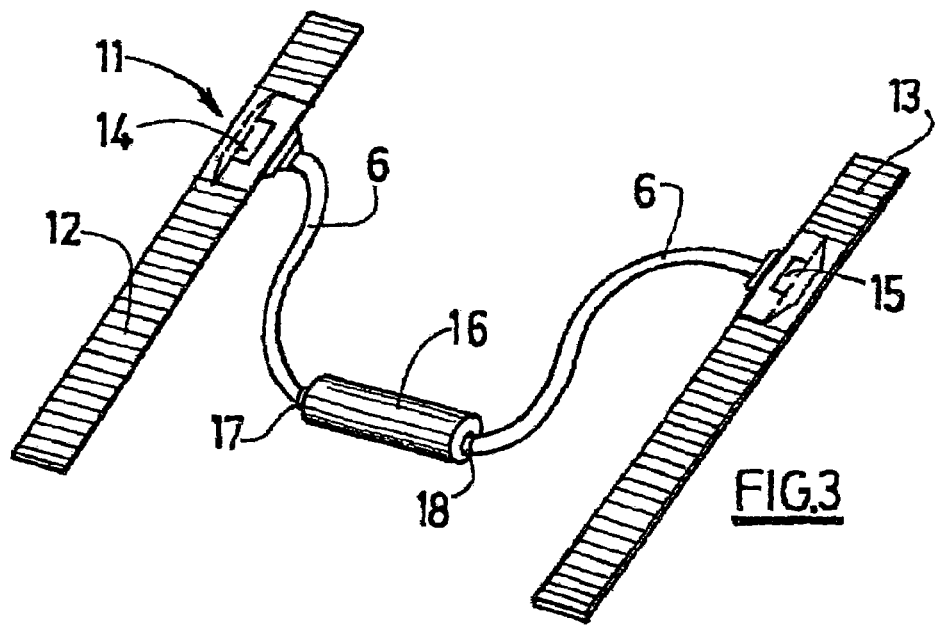
FIG. 3 is a perspective view of a seat adjustment system of the invention for adjusting a vehicle seat.
Figure 4:
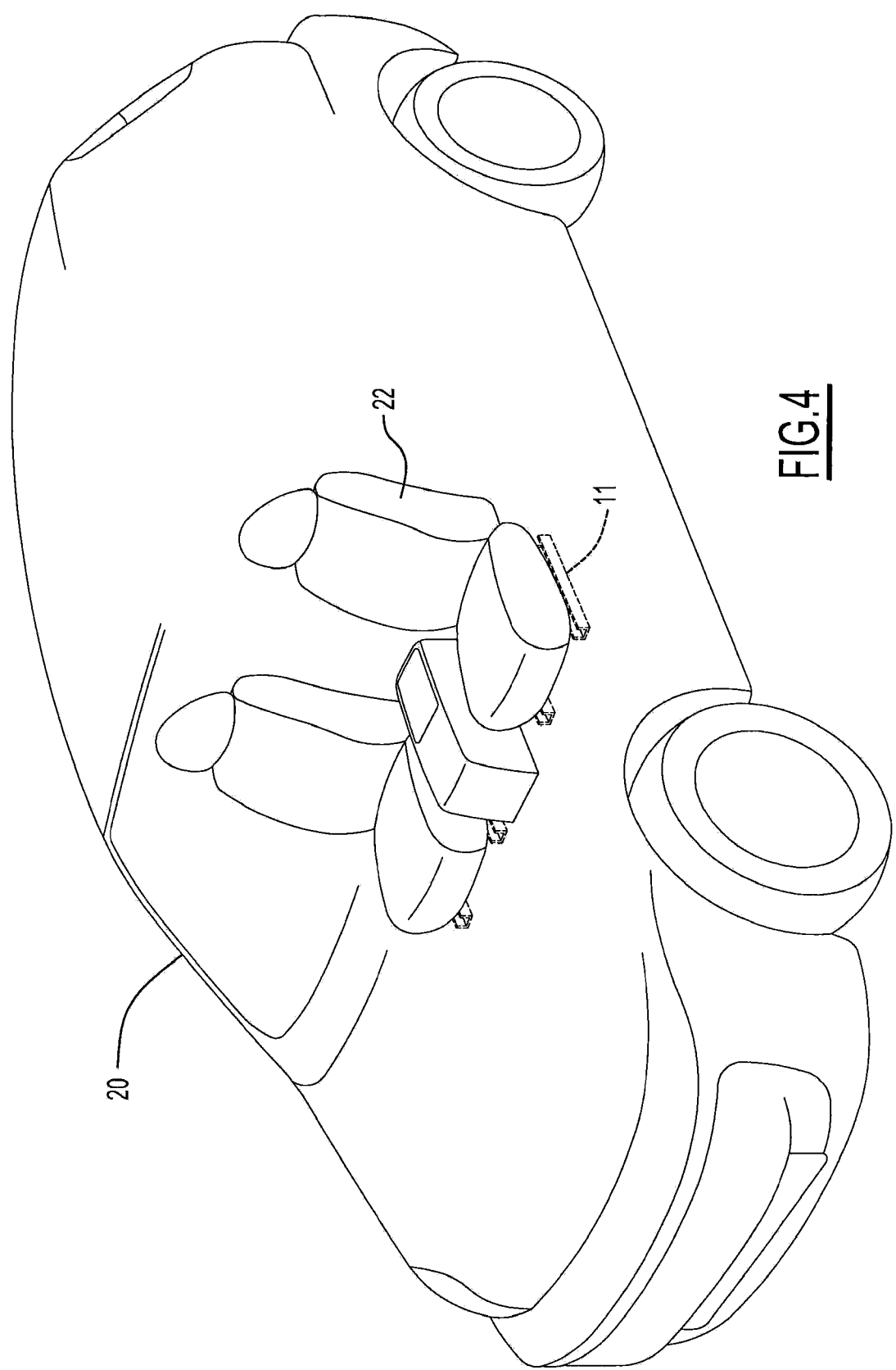
FIG. 4 is an environmental view of the seat adjustment system of FIG. 3 shown in an exemplary vehicle.

With reference to FIG. 3 and 4, a description follows of motor vehicle seat adjustment device 11 including a rotary motion transmission device 6 as defined above. Such an adjustment system 11 includes two runners 12 and 13 fastened by any suitable means to the structure (not shown) of a motor vehicle 20. The runners are provided with adjustment notches whose function is described below. The runners 12 and 13 support the framework of a seat 22 of the vehicle 20, movement and fastening of the seat 22 relative to the runners being achieved by adjustable means such as gears 14 and 15 respectively provided with toothed wheels co-operating with the above-mentioned notches in the runners 12 and 13.

An electric motor 16 is fastened to the structure of the vehicle 20 or, in a variant, to the framework of the seat 22. The motor 16 has two rotary outlets 17 and 18. The outlets 17 and 18 are connected by rotary motion transmission devices 6 of the invention to respective ones of the gears 14 and 15. When the motor 16 is powered, it drives the flexible shafts 1 of the transmission devices 6 in rotation inside their sheaths 7. The shafts 1 in turn drive the gears 14 and 15, thereby moving the seat 22 along the runners 12 and 13.

The invention claimed is:

1. A flexible shaft designed to rotate inside a sheath for the purpose of transmitting rotary motion, the shaft comprising at least one core wire and winding wires wound around the core wire, the winding wires having a substantially smooth and continuous outer surface wherein the core wire presents elasticity and resilience that are lower than the elasticity and resilience of the winding wires.

2. A flexible shaft according to claim 1 wherein the core wire and the winding wires are made of different materials.

3. A flexible shaft according to claim 2 wherein the core wire is a wire made of a material chosen from annealed copper and annealed brass.

4. A flexible shaft according to claim 1 wherein the winding wires are steel wires.

5. A flexible shaft according to claim 1 wherein the winding wires are in the form of at least one strip of a plurality of winding wires, and the strip is wound helically around and directly engaging the core wire.

6. A flexible shaft according to claim 1 further comprising a plurality of strips of winding wires are mutually superposed around the core wire.

7. A flexible shaft according to claim 1 wherein an outside surface of the shaft is machined.

8. A flexible shaft according to claim 1 wherein an outside surface of the shaft is provided with flocking.

9. A rotary motion transmission device comprising a sheath and a flexible shaft received inside the sheath, the sheath comprising a core formed of a hollow cylinder whose inside diameter is arranged to enable the shaft to rotate inside the sheath, the flexible shaft having at least one core wire and winding wires wound around the core wire, the winding wires having a substantially smooth and continuous outer surface, wherein the core wire has an elasticity that is lower than the elasticity of the winding wires.

10. A transmission device according to claim 9 wherein the core of the sheath is formed by a helical spring made of metal.

11. A transmission device according to claim 9 wherein the sheath further comprises a tubular outer cladding made of a plastics material and that encases the core.

12. A transmission device according to claim 9 further comprising a lubricant disposed inside the sheath.

13. A transmission device according to claim 9 wherein the sheath is flexible, made of a plastics material, and its inside surface is smooth.

14. A transmission device according to claim 9 wherein the core of the sheath is provided with flocking on its inside surface.

15. An adjustment system for adjusting a seat of a motor vehicle, the system comprising:
 a seat;
 at least one adjustment runner mounted on a structure of the motor vehicle;
 adjustable means for fastening the seat to the runner(s);
 a drive motor provided with at least one rotary outlet; and
 a transmission disposed between the outlet of the drive motor and the adjustable means, so as to move the adjustable means along the adjustment runner in response to the outlet rotating, the transmission including a flexible shaft rotatably received within a sheath, the flexible shaft having a core wire and winding wires wound around the core wire, the winding wires having a smooth, continuous surface, wherein the core wire presents elasticity and resilience that are lower than the elasticity and resilience of the wires.

16. The transmission device of claim 9 wherein the flexable shaft consists of a core wire having winding, formed of a distinct material than the core, wound direct around the core wire.

17. The transmission device of claim 16 wherein the outside surface wires are machined.

* * * * *